(12) United States Patent
Deng et al.

(10) Patent No.: US 12,469,870 B2
(45) Date of Patent: Nov. 11, 2025

(54) WINDING TYPE BATTERY CELL AND WINDING BATTERY

(71) Applicant: Microvast Power Systems Co., Ltd., Huzhou (CN)

(72) Inventors: Guoyou Deng, Huzhou (CN); Xiaofeng Yin, Huzhou (CN); Cunkui Yin, Huzhou (CN); Xiaojie Shen, Huzhou (CN)

(73) Assignee: MICROVAST POWER SYSTEMS CO., LTD., Huzhou (CN)

( * ) Notice: Subject to any disclaimer, the term of this patent is extended or adjusted under 35 U.S.C. 154(b) by 498 days.

(21) Appl. No.: 17/932,674

(22) Filed: Sep. 16, 2022

(65) Prior Publication Data

US 2023/0085630 A1 Mar. 23, 2023

(30) Foreign Application Priority Data

Sep. 18, 2021 (CN) .......................... 202122281542.9

(51) Int. Cl.
*H01M 10/04* (2006.01)
*H01M 50/538* (2021.01)
(Continued)

(52) U.S. Cl.
CPC ..... *H01M 10/0431* (2013.01); *H01M 50/538* (2021.01); *H01M 50/586* (2021.01); *H01M 50/593* (2021.01)

(58) Field of Classification Search
CPC ........... H01M 10/0431; H01M 50/538; H01M 50/586; H01M 50/593; H01M 10/052; H01M 50/107; Y02E 60/10; Y02P 70/50
See application file for complete search history.

(56) References Cited

U.S. PATENT DOCUMENTS 6,335,114 B1 * 1/2002 Ueshima ............. H01M 4/0416
429/162
2018/0331399 A1 * 11/2018 Shimizu ............. H01M 10/425

FOREIGN PATENT DOCUMENTS

| CN | 107785606 | * | 10/2017 | ........ H01M 10/0525 |
| CN | 108598353 | * | 9/2018 | ........ H01M 10/0431 |
| CN | 113314763 | * | 6/2021 | ............ H01M 10/04 |

OTHER PUBLICATIONS

English Translation CN 107785606 Jan. 10, 2025 (Year: 2017).*
English Translation CN11334763 Jan. 10, 2025 (Year: 2021).*
English Translation CN 108598353 Jan. 23, 2025 (Year: 2018).*

* cited by examiner

*Primary Examiner* — Kaj K Olsen
(74) *Attorney, Agent, or Firm* — Andrew C. Cheng

(57) ABSTRACT

A winding type battery cell includes a roll core and at least one electrode sheet unit. The roll core includes a positive connection part, a negative connection part and an insulation part located between the positive connection part and the negative connection part. The positive connection part and the negative connection part are respectively connected with two ends of the insulation part. The electrode sheet unit includes a positive electrode sheet, a negative electrode sheet and a separator. The positive electrode sheet and the negative electrode sheet are separated by the separator. The positive electrode sheet is connected with the positive connection part, and the negative electrode sheet is connected with the negative connection part. The winding type battery cell is formed by winding the electrode sheet unit around the roll core. A winding battery with the winding type battery cell is also provided.

12 Claims, 6 Drawing Sheets

(51) Int. Cl.
*H01M 50/586* (2021.01)
*H01M 50/593* (2021.01)

WINDING TYPE BATTERY CELL AND WINDING BATTERY

TECHNICAL FIELD

The present disclosure relates to the technical field of batteries, and in particular, to a winding type battery cell and a winding battery.

BACKGROUND OF THE INVENTION

With the development of electronic technology, lithium-ion battery has been widely used because of its high specific power, long cycle life, good safety performance and low pollution. The volume of the traditional winding type battery cell will not be too large due to the small number of winding turns of the electrode sheet. In order to improve the capacity of the winding type battery cell and reduce the manufacturing cost of the winding type battery cell, the diameter of the winding type battery cell begins to increase gradually.

However, when making high-capacity and large volume winding type battery cells, the electrode sheet needs to be wound for many times. Due to the excessive number of winding turns of the electrode sheet and the excessive bending stress on the electrode sheet, it is easy to cause the active materials on the positive and negative electrode sheets to fall off, and even cause the deformation or fracture of the electrode sheet, which greatly reduces the performance of high-capacity and large volume winding type battery cells. Moreover, when the electrode sheet is wound, the closer the electrode sheet is to the winding center, the smaller the winding radius, and the greater the bending degree of the inner side of the electrode sheet (i.e., the side close to the winding center), which makes the inner side of the electrode sheet easier to deform or break.

SUMMARY OF THE INVENTION

The object of the present disclosure is to provide a winding type battery cell and a winding battery for solving the shortcomings of the above background technology. The winding type battery cell is formed by winding the electrode sheet unit around the roll core. The roll core can increase the winding radius of the electrode sheet unit to reduce the bending degree of the electrode sheet unit, so as to avoid the falling off of active materials on the electrode sheet and the deformation or fracture of the electrode sheet, and improve the performance of high-capacity and large-volume winding type battery cells and winding batteries.

An embodiment of the present disclosure provides a winding type battery cell including a roll core and at least one electrode sheet unit. The roll core includes a positive connection part, a negative connection part and an insulation part located between the positive connection part and the negative connection part. The positive connection part and the negative connection part are respectively connected with two ends of the insulation part. The electrode sheet unit includes a positive electrode sheet, a negative electrode sheet and a separator, the positive electrode sheet and the negative electrode sheet are separated by the separator, the positive electrode sheet is connected with the positive connection part, the negative electrode sheet is connected with the negative connection part, and the winding type battery cell is formed by winding the electrode sheet unit around the roll core.

Thus, the positive and negative electrode sheets are separated by the separator and wound on the roll core. After winding, the winding radius can be increased, the bending degree of the positive and negative electrode sheets can be reduced, and then the stress of the positive and negative electrode sheets can be reduced, so as to avoid the falling off of active materials on the electrode sheets and the deformation or fracture of the electrode sheets, and improve the performance of the high-capacity and large volume winding type battery cell and the winding battery.

In one realizable way, the positive electrode sheet, the separator, the negative electrode sheet and the separator of the electrode sheet unit are wound separately around the roll core to form the winding type battery cell.

In one realizable way, the electrode sheet unit is formed by integrated processing after laminating the positive electrode sheet, the negative electrode sheet and the separator.

There are two ways to connect the electrode sheets and the connection part. One way is that the positive and negative electrode sheets are respectively connected to the positive and negative connection parts, and then the positive and negative electrode sheets connected to the positive and negative connection parts and the separator form the electrode sheet unit, wherein the separator can be connected with the positive electrode sheet or the negative electrode sheet to be indirectly fixed to the positive and negative connection parts. The other way is that the positive and negative electrode sheets and the separator are first combined into the electrode sheet unit, for example, by hot pressing, and then the positive and negative electrode sheets in the electrode sheet unit are respectively connected with the positive and negative connection parts. The winding type battery cell formed in these two ways has two forms respectively. One form is that the positive electrode sheet, the separator, the negative electrode sheet and the separator of the electrode sheet unit are wound separately around the roll core to form the winding type battery cell. The other form is that the positive and negative electrode sheets and the separator are first laminated to form the electrode sheet unit, and then the electrode sheet unit is wound on the roll core to form the winding type battery cell.

In one realizable way, the positive electrode sheet is provided with a positive tab, the negative electrode sheet is provided with a negative tab, the positive tab and the negative tab are located on the same side of the electrode sheet unit, the positive tab is connected with the positive connection part, and the negative tab is connected with the negative connection part.

In one realizable way, there are a plurality of electrode sheet units, the positive electrode sheet in each electrode sheet unit is provided with a positive tab, the positive electrode sheet is connected with the positive connection part through the positive tab, such that all the positive electrode sheets of the electrode sheet units are connected with the positive connection part; the negative electrode sheet in each electrode sheet unit is provided with a negative tab, the negative electrode sheet is connected with the negative connection part through the negative tab, such that all the negative electrode sheets of the electrode sheet units are connected with the negative connection part.

In one realizable way, the roll core is a sheet structure, there are a plurality of electrode sheet units, the plurality of the electrode sheet units are arranged sequentially along a width direction of the roll core, adjacent electrode sheet units are separated by the separator, and the winding type battery cell is formed by winding the plurality of the electrode sheet units around the roll core.

In one realizable way, the positive connection part, the negative connection part and the insulation part are each in a sheet structure. The insulation part includes a first insulation plate and a second insulation plate arranged oppositely. The first insulation plate and the second insulation plate are respectively located on the upper and lower sides of the positive connection part and the negative connection part. The positive connection part and the negative connection part are sandwiched between the first insulation plate and the second insulation plate.

In one realizable way, the roll core is a columnar structure, there are a plurality of electrode sheet units, the plurality of the electrode sheet units are arranged sequentially along a circumferential direction of the roll core, adjacent electrode sheet units are separated by the separator, and the winding type battery cell is formed by winding the plurality of the electrode sheet units around the roll core.

Thus, after a plurality of the electrode sheet units are arranged in sequence and wound along the width direction (when the roll core is a sheet structure) or the circumferential direction (when the roll core is a columnar structure), the electrode sheet unit set at the position farther away from the center of the roll core of the sheet structure has a larger winding radius, and the electrode sheet unit set at the position farther away from the roll core of the columnar structure has a larger winding radius. The larger the winding radius, the smaller the stress on the electrode sheet unit during winding, so that the active materials on the positive and negative electrode sheets are not easy to fall off, so as to prevent the deformation or fracture of the positive and negative electrode sheets, and improve the performance of the winding type battery cell and the winding battery.

In one realizable way, the roll core is a round cylindrical structure or a polygonal cylindrical structure.

In one realizable way, the positive connection part is provided with a first electrical connection part, the negative connection part is provided with a second electrical connection part, and the first electrical connection part and the second electrical connection part are respectively located at two ends of the roll core.

In one realizable way, the number of each of the positive electrode sheet and the negative electrode sheet in each electrode sheet unit is one, the number of the separator in each electrode sheet unit is two, wherein one separator is sandwiched between the positive electrode sheet and the negative electrode sheet, and another separator is attached to one surface of the positive electrode sheet or the negative electrode sheet.

In one realizable way, the number of each of the separator, the positive electrode sheet and the negative electrode sheet in each electrode sheet unit is multiple, the multiple positive electrode sheets and the multiple negative electrode sheets are arranged alternately, and the positive electrode sheet and a neighboring negative electrode sheet are separated by a separator. The electrode sheet unit is formed by integrated processing after laminating the multiple separators, the multiple positive electrode sheets and the multiple negative electrode sheets.

Another embodiment of the present disclosure further provides a winding battery including the winding type battery cell described above.

The winding type battery cell provided by the present disclosure is formed by winding the electrode sheet unit around the roll core. The roll core can increase the winding radius of the electrode sheet unit to reduce the bending degree and bending stress of the electrode sheet unit, so as to avoid the falling off of active materials on the electrode sheets and the deformation or fracture of the electrode sheets. Moreover, the roll core can significantly increase the winding radius on the inner side of the electrode sheet unit (i.e., the side of the electrode sheet unit close to the roll core) to reduce the bending degree on the inner side of the electrode sheet unit, so as to avoid deformation or fracture on the inner side of the electrode sheet unit.

In the figures: 1 winding type battery cell, 2 roll core, 21 positive connection part, 211 first electrical connection part, 22 negative connection part, 221 second electrical connection part, 23 insulation part, 231 first insulation plate, 232 second insulation plate, 3 electrode sheet unit, 31 positive electrode sheet, 311 positive tab, 32 negative electrode sheet, 321 negative tab, 33 separator, 4 shell, 41 positive cover plate, 42 negative cover plate, 421 liquid injection hole, 43 outer casing, 44 insulation plate, 45 film layer, 46 sealing nail, 47 sealing element.

DETAILED DESCRIPTION OF PREFERRED EMBODIMENTS

Specific embodiments of the present disclosure will be further described in detail below in conjunction with the accompanying drawings. The following embodiments are used to illustrate the present disclosure, but are not used to limit the scope of the present disclosure.

The terms "first", "second", "third", "fourth" and the like (if any) involved in the description and claims of the present disclosure are used to distinguish similar objects, and are not used to describe a specific order or sequence.

The spatial terms "up", "down", "left", "right", "front", "back", "top", "bottom" and the like (if any) involved in the description and claims of the present disclosure are defined by the positions of the structures in the figures and the positions between the structures, only for the clarity and convenience of expressing the technical solution. It should be understood that the use of these spatial terms should not limit the scope of the present disclosure.

Figure 1:
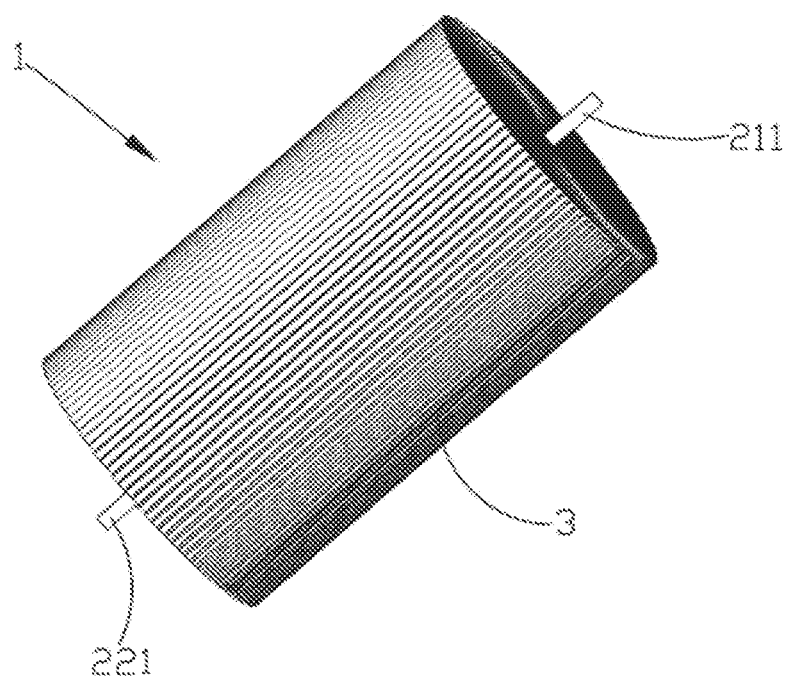
FIG. 1 is a three-dimensional structural diagram of the winding type battery cell in the first embodiment of the present disclosure.
Figure 2:
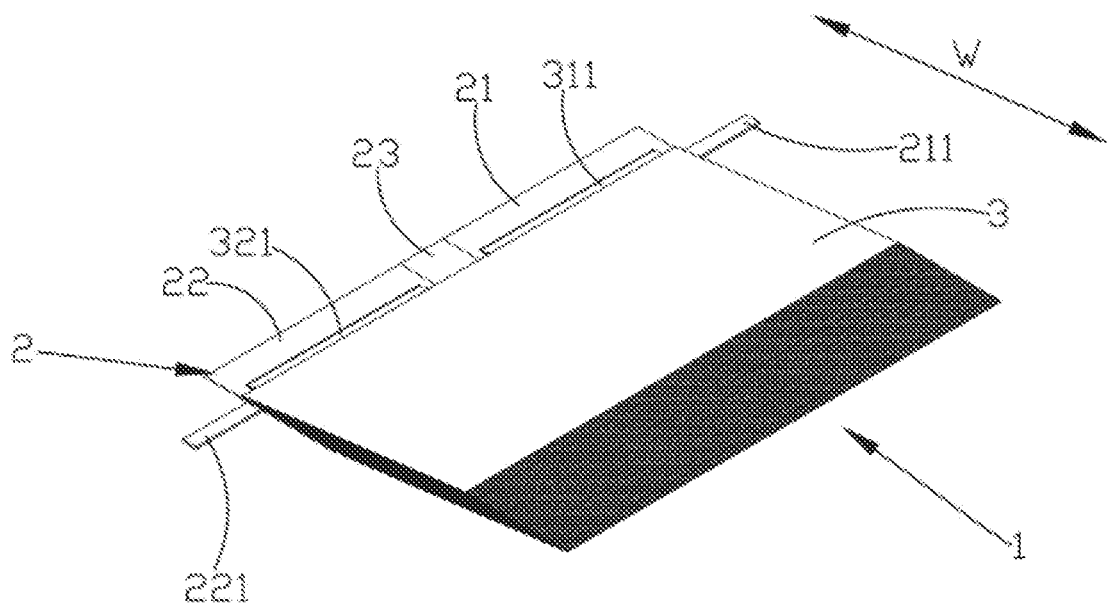
FIG. 2 is a three-dimensional structural diagram of the winding type battery cell in the first embodiment of the present disclosure when it has not been wound.
Figure 3:
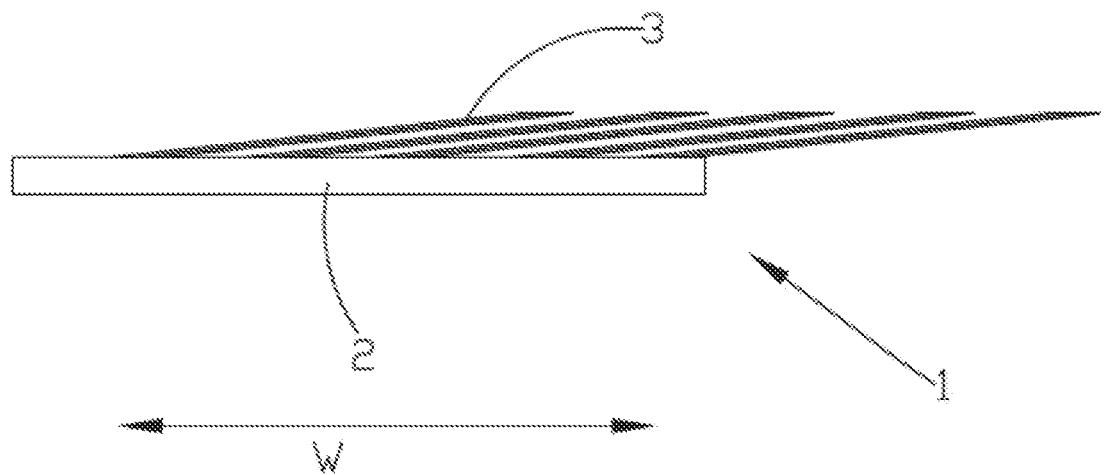
FIG. 3 is a side view of FIG. 2.

As shown in FIG. 1 to FIG. 4 and FIG. 7, the winding type battery cell 1 provided by the embodiment of the present disclosure includes a roll core 2 and at least one electrode sheet unit 3. The roll core 2 is located at the center position of the winding type battery cell 1. The roll core 2 includes a positive connection part 21, a negative connection part 22, and an insulation part 23 located between the positive connection part 21 and the negative connection part 22. The positive connection part 21 and the negative connection part 22 are respectively connected with two ends of the insulation part 23. Each electrode sheet unit 3 includes a positive electrode sheet 31, a negative electrode sheet 32 and a separator 33. The positive electrode sheet 31 and the negative electrode sheet 32 are separated by the separator 33. The positive electrode sheet 31 is connected with the positive connection part 21, and the negative electrode sheet 32 is connected with the negative connection part 22. The winding type battery cell 1 is formed by winding the electrode sheet unit 3 around the roll core 2. As shown in FIG. 2 and FIG. 3, the winding type battery cell 1 generally has a sheet structure before winding. As shown in FIG. 1, the winding type battery cell 1 forms a cylindrical structure after winding.

Specifically, the positive connection part 21 and the negative connection part 22 act as a base. All the positive electrode sheets 31 are connected with the positive connection part 21, and then electrically connected with a positive electrode of the battery through the positive connection part 21. All the negative electrode sheets 32 are connected to the negative connection part 22, and then electrically connected to a negative electrode of the battery through the negative connection part 22. The insulation part 23 not only plays the role of connecting the positive connection part 21 and the negative connection part 22, even if the roll core 2 is integrated in a whole, so as to facilitate the connection between the electrode sheet unit 3 and the roll core 2 and the winding of the electrode sheet unit 3 around the roll core 2, but also plays the role of insulating the positive connection part 21 and the negative connection part 22, so as to prevent the positive connection part 21 and the negative connection part 22 from contacting during production or use of the winding type battery cell 1. The positive connection part 21, the negative connection part 22 and the insulation part 23 can be formed as a whole by thermoforming.

Figure 6:
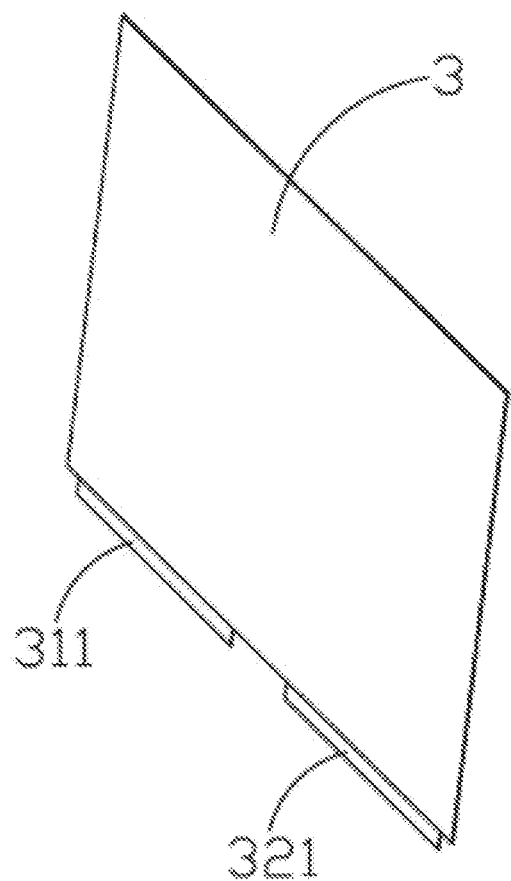
FIG. 6 is a structural diagram of the electrode sheet unit in FIG. 2.
Figure 7:
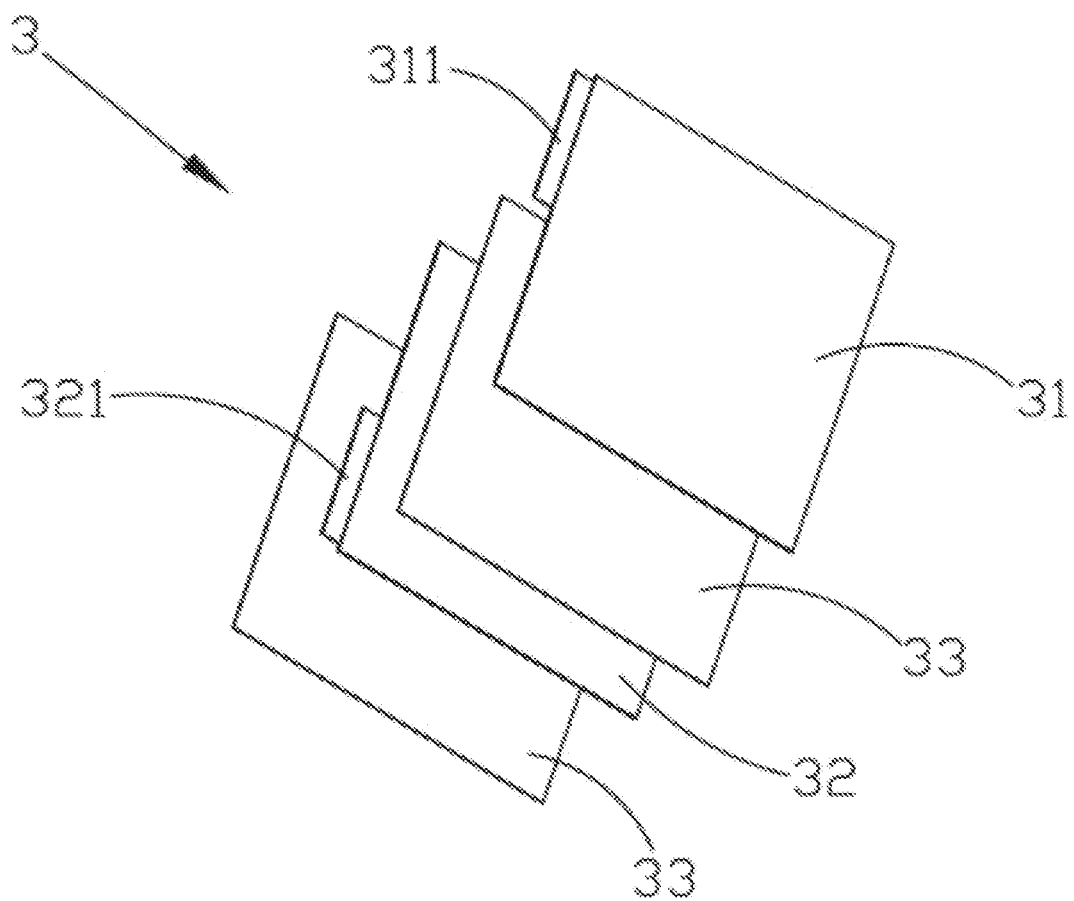
FIG. 7 is an exploded view of FIG. 6.
Figure 9:
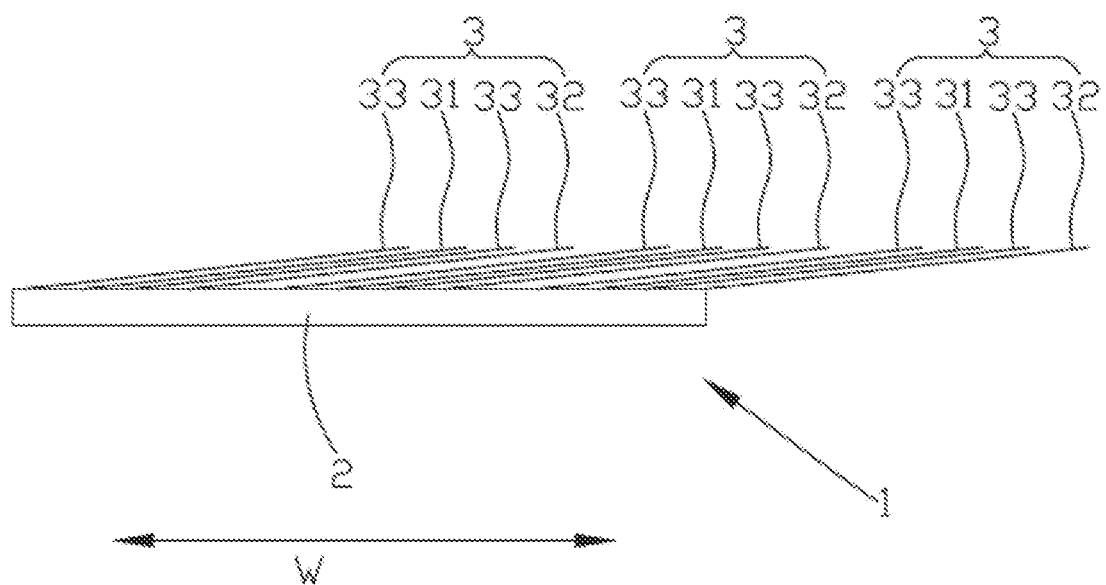
FIG. 9 is a side view of the winding type battery cell in the third embodiment of the present disclosure when it has not been wound.

As shown in FIG. 3, FIG. 6 and FIG. 7, in one embodiment, each electrode sheet unit 3 is formed by integrated processing (e.g., thermoforming, especially hot pressing) after laminating the positive electrode sheet 31, the negative electrode sheet 32 and the separator 33, that is, each electrode sheet unit 3 is an integral sheet structure before winding, and the electrode sheet unit 3 of the integral structure can be easily connected with the roll core 2. Of course, as shown in FIG. 9, in another embodiment, the positive electrode sheet 31, the negative electrode sheet 32 and the separator 33 in each electrode sheet unit 3 may not be combined as a whole, that is, the positive electrode sheet 31, the negative electrode sheet 32 and the separator 33 in each electrode sheet unit 3 may be wound around the roll core 2 separately. In one embodiment, the number of each of the positive electrode sheet 31 and the negative electrode sheet 32 in each electrode sheet unit 3 is one, and the number of the separator 33 in each electrode sheet unit 3 is two. One separator 33 is sandwiched between the positive electrode sheet 31 and the negative electrode sheet 32 to insulate the positive electrode sheet 31 from the negative electrode sheet 32, another separator 33 is attached to one surface of the positive electrode sheet 31 or the negative electrode sheet 32 to prevent the positive electrode sheets 31 and the negative electrode sheets 32 from contacting during the winding of the electrode sheet units 3, so as to ensure that the positive electrode sheets 31 and the negative electrode sheets 32 between adjacent electrode sheet units 3 are separated by the separators 33. The two separators 33, the positive electrode sheet 31 and the negative electrode sheet 32 in each electrode sheet unit 3 are laminated in the order of separator 33, positive electrode sheet 31, separator 33 and negative electrode sheet 32, or in the order of separator 33, negative electrode sheet 32, separator 33 and positive electrode sheet 31, and then formed into a whole by thermoforming.

In another embodiment, each electrode sheet unit 3 is an integral sheet structure before winding. The number of each of the separator 33, the positive electrode sheet 31 and the negative electrode sheet 32 in each electrode sheet unit 3 is multiple. The multiple positive electrode sheets 31 and the multiple negative electrode sheets 32 are arranged alternately, the positive electrode sheet 31 and a neighboring negative electrode sheet 32 are separated by a separator 33, and each electrode sheet unit 3 is formed by integrated processing (e.g., thermoforming, especially hot pressing) after laminating the multiple separators 33, the multiple positive electrode sheets 31 and the multiple negative electrode sheets 32. Meanwhile, the separator 33 is also required on one surface of the outermost positive electrode sheet 31 and/or negative electrode sheet 32 to prevent the positive electrode sheet 31 and the negative electrode sheet 32 from contacting during the winding of the electrode sheet units 3, so as to ensure that the positive electrode sheet 31 and the negative electrode sheet 32 between adjacent electrode sheet units 3 are separated by the separator 33. The multiple separators 33, the multiple positive electrode sheets 31 and the multiple negative electrode sheets 32 in each electrode sheet unit 3 are laminated in the order of separator 33, positive electrode sheet 31, separator 33 and negative electrode sheet 32, or in the order of separator 33, negative electrode sheet 32, separator 33 and positive electrode sheet 31, and then formed into a whole by thermoforming.

As shown in FIG. 2, FIG. 6 and FIG. 7, in one embodiment, the positive electrode sheet 31 is provided with a positive tab 311, the negative electrode sheet 32 is provided with a negative tab 321, the positive tab 311 and the negative tab 321 are located on the same side of the electrode sheet unit 3, the positive tab 311 is connected with the positive connection part 21, and the negative tab 321 is connected with the negative connection part 22.

In one embodiment, a plurality of electrode sheet units 3 are wound on the roll core 2 in the winding type battery cell 1. The positive electrode sheet 31 in each electrode sheet unit 3 is provided with a positive tab 311, and the positive electrode sheet 31 is connected with the positive connection part 21 through the positive tab 311, so that all the positive electrode sheets 31 of the electrode sheet units 3 are connected with the positive connection part 21. The negative electrode sheet 32 in each electrode sheet unit 3 is provided with a negative tab 321, and the negative electrode sheet 32 is connected with the negative connection part 22 through the negative tab 321, so that all the negative electrode sheets 32 of the electrode sheet units 3 are connected with the negative connection part 22.

In one embodiment, the positive tab 311 and the positive connection part 21 are connected by welding, and the negative tab 321 and the negative connection part 22 are connected by welding.

Figure 4:
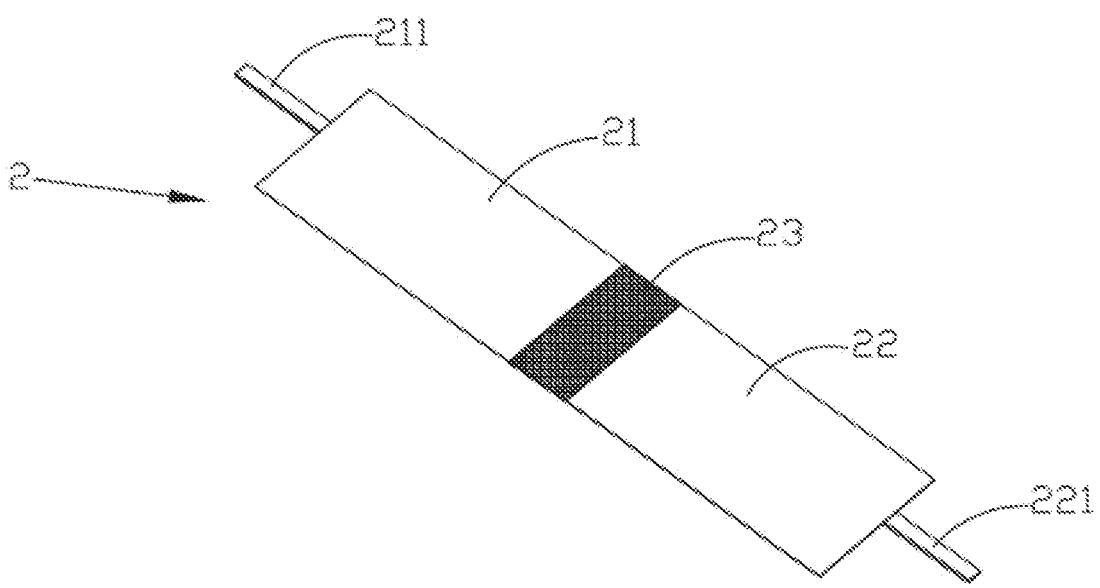
FIG. 4 is a structural diagram of the roll core in FIG. 2.

As shown in FIG. 2 to FIG. 4, in one embodiment, the roll core 2 is a sheet structure before winding, there are a plurality of electrode sheet units 3, the plurality of electrode sheet units 3 are connected with the roll core 2, the plurality of electrode sheet units 3 are arranged sequentially along the width direction W of the roll core 2, and the winding type battery cell 1 is formed by winding the plurality of electrode sheet units 3 around the roll core 2.

Figure 5:
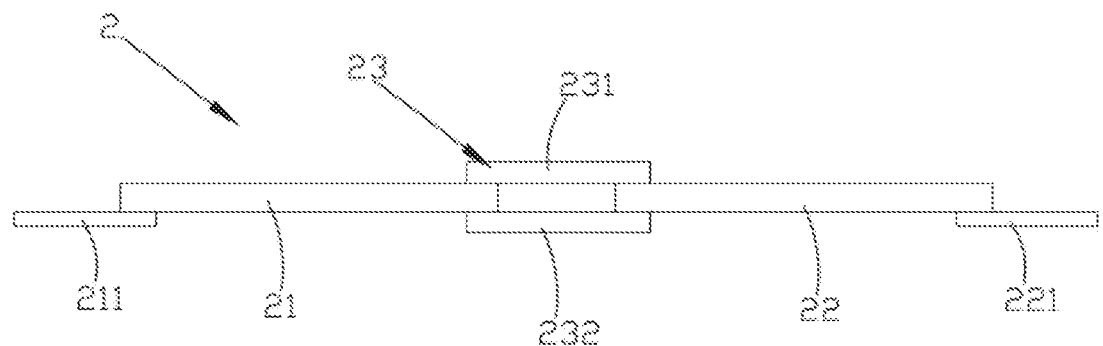
FIG. 5 is a side view of FIG. 4.

As shown in FIG. 4 and FIG. 5, in one embodiment, the positive connection part 21, the negative connection part 22 and the insulation part 23 are each in a sheet structure before winding. The insulation part 23 includes a first insulation plate 231 and a second insulation plate 232 arranged oppositely. The first insulation plate 231 and the second insulation plate 232 are respectively located on the upper and lower sides of the positive connection part 21 and the negative connection part 22, and the positive connection part 21 and the negative connection part 22 are sandwiched between the first insulation plate 231 and the second insulation plate 232. That is, two ends of the first insulation plate 231 are respectively fits with the top surface of the positive connection part 21 and the top surface of the negative connection part 22, and two ends of the second insulation plate 232 are respectively fits with the bottom surface of the positive connection part 21 and the bottom surface of the negative connection part 22. After sandwiching the positive connection part 21 and the negative connection part 22 between the two ends of the first insulation plate 231 and the two ends of the second insulation plate 232, then the positive connection part 21, the negative connection part 22, the first insulation plate 231 and the second insulation plate 232 are formed as a whole by thermoforming, e.g., hot pressing.

As shown in FIG. 2 and FIG. 4, in one embodiment, the positive connection part 21 is provided with a first electrical connection part 211, the negative connection part 22 is provided with a second electrical connection part 221, and the first electrical connection part 211 and the second electrical connection part 221 are respectively located at two ends of the roll core 2.

In one embodiment, the first electrical connection part 211 and the positive connection part 21 are connected by welding, and the second electrical connection part 221 and the negative connection part 22 are connected by welding.

As shown in FIG. 4, in one embodiment, the positive connection part 21 is an aluminum sheet and the negative connection part 22 is a copper sheet. The first electrical connection part 211 is an aluminum strip, and the second electrical connection part 221 is a copper strip. The insulation part 23 is made of PPS (polyphenylene sulfide). Of course, the positive connection part 21, the negative connection part 22, the first electrical connection part 211 and the second electrical connection part 221 can also be made from other conductive materials, and the insulation part 23 can also be made from other insulating materials.

Figure 8:
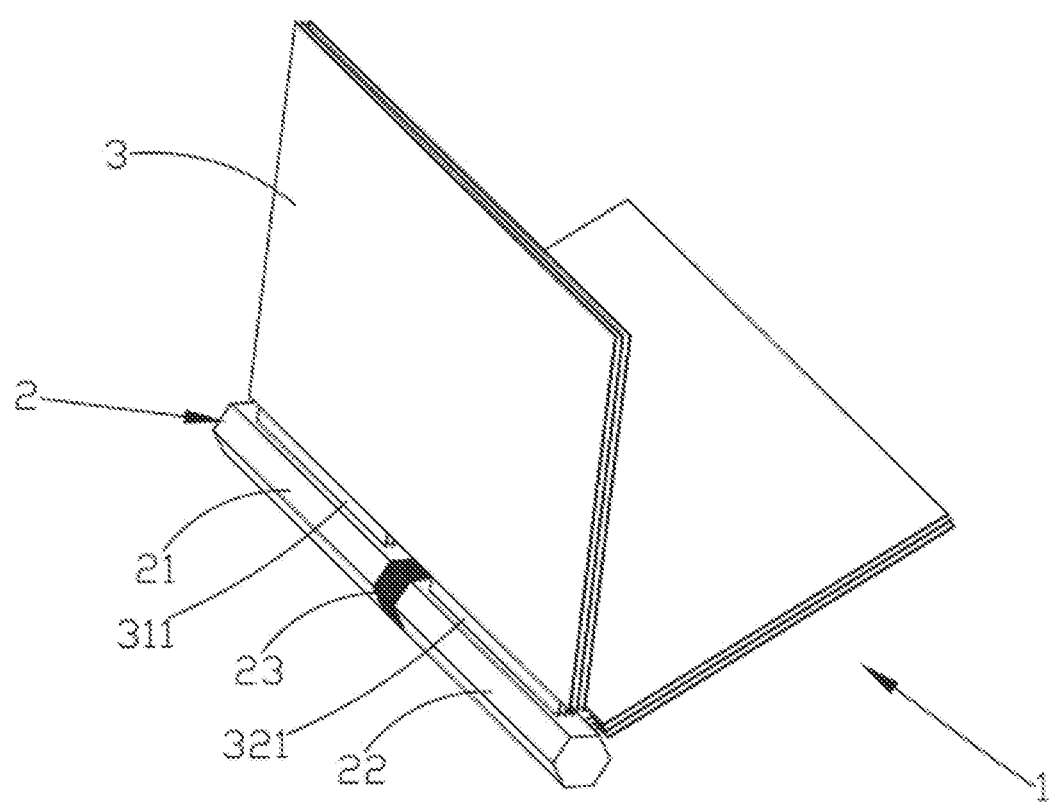
FIG. 8 is a three-dimensional structural diagram of the winding type battery cell in the second embodiment of the present disclosure when it has not been wound.

As shown in FIG. 8, in another embodiment, the roll core 2 is a columnar structure, there are a plurality of electrode sheet units 3, the plurality of electrode sheet units 3 are connected with the roll core 2, the plurality of electrode sheet units 3 are arranged sequentially along the circumferential direction of the roll core 2, and the winding type battery cell 1 is formed by winding the plurality of electrode sheet units 3 around the roll core 2. The roll core 2 can be a round cylindrical structure or a polygonal cylindrical structure. The positive connection part 21, the negative connection part 22 and the insulation part 23 are each a columnar structure, wherein the positive connection part 21 is an aluminum column, the negative connection part 22 is a copper column, the material of the insulation part 23 is PPS, and the positive connection part 21, the negative connection part 22 and the insulation part 23 are fixedly connected as a whole. Of course, the positive connection part 21 and the negative connection part 22 can also be made from other conductive materials, and the insulation part 23 can also be made from other insulating materials.

Figure 10:
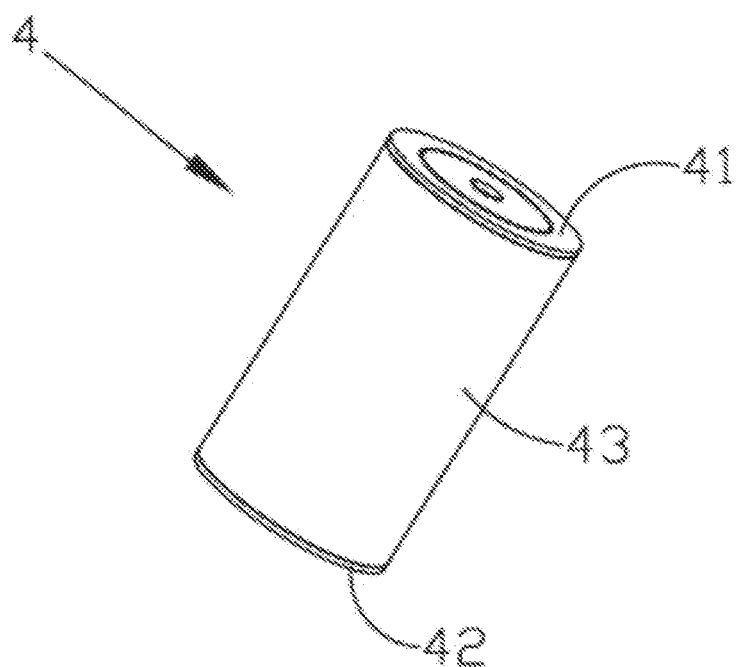
FIG. 10 is a three-dimensional structural diagram of the winding battery in the embodiment of the present disclosure.
Figure 11:
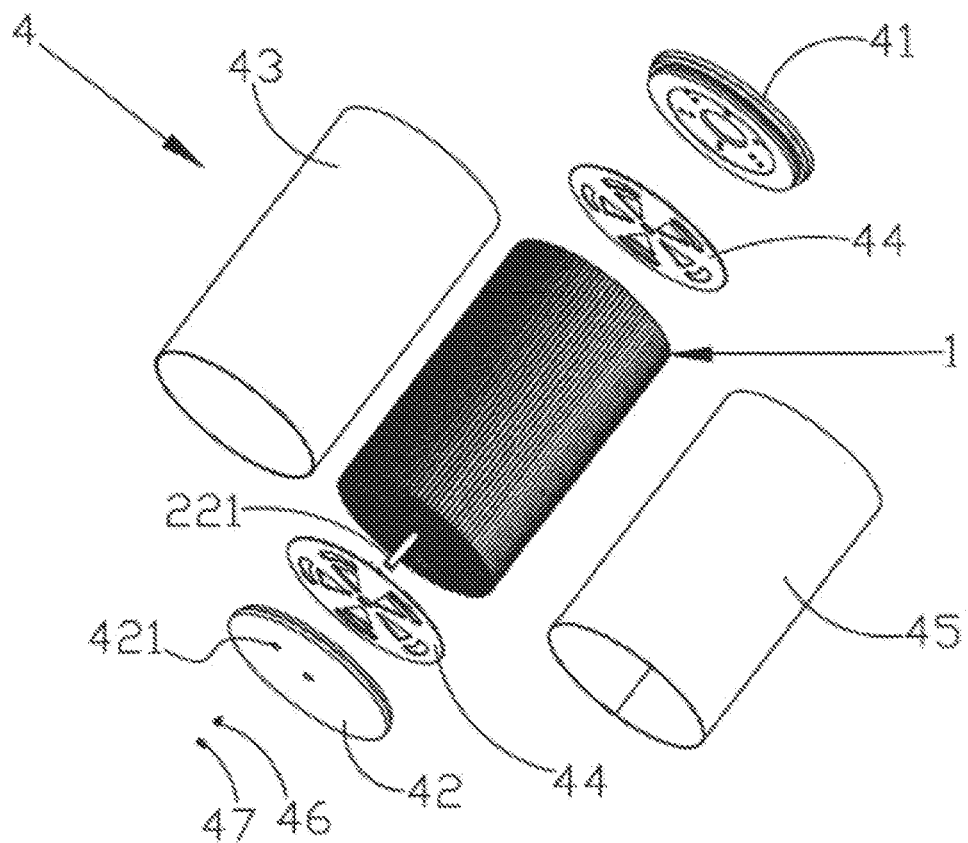
FIG. 11 is an exploded view of FIG. 10.

As shown in FIG. 10 and FIG. 11, the present disclosure further provides a winding battery including the winding type battery cell 1 described above. The winding battery further includes a shell 4 for packing the winding type battery cell 1. The shell 4 includes a positive cover plate 41, a negative cover plate 42 and an outer casing 43. An insulation plate 44 is arranged between the winding type battery cell 1 and each of the positive cover plate 41 and the negative cover plate 42. A film layer 45 is arranged between the winding type battery cell 1 and the outer casing 43. A sealing nail 46 and a sealing element 47 are provided on the negative cover plate 42, or optionally, the sealing nail 46 and the sealing element 47 may be provided on the positive cover plate 41. After the winding of the winding type battery cell 1 is completed, the film layer 45 is packed on the outer surface of the winding type battery cell 1. The film layer 45 is generally Mylar film to prevent the winding type battery cell 1 from loosening and has the function of insulation. Then, the winding type battery cell 1 is placed into the outer casing 43, and then the insulation plates 44 are attached to two ends of the winding type battery cell 1. The first electrical connection part 211 on the winding type battery cell 1 passes through the upper insulation plate 44 and is welded and fixed with the positive cover plate 41. The second electrical connection part 221 on the winding type battery cell 1 passes through the lower insulation plate 44 and is welded and fixed with the negative cover plate 42. Then, the positive cover plate 41 and the negative cover plate 42 are respectively fixed with two ends of the outer casing 43. The negative cover plate 42 is provided with a liquid injection hole 421, or optionally, the liquid injection hole 421 may be provided in the positive cover plate 41. After the electrolyte is injected into the winding battery through the liquid injection hole 421, the sealing nail 46 is inserted into the liquid injection hole 421, and then the sealing element 47 is welded to the liquid injection hole 421 to seal the liquid injection hole 421. Thus, the assembly of the winding battery is completed.

The winding type battery cell 1 provided by the embodiment of the present disclosure is formed by winding the electrode sheet unit 3 around the roll core 2. The roll core 2 can increase the winding radius of the electrode sheet unit 3 to reduce the bending degree and bending stress of the electrode sheet unit 3, so as to avoid the falling off of active materials on the electrode sheet 31/32 and the deformation or fracture of the electrode sheet 31/32. Also, the roll core 2 can significantly increase the winding radius on the inner side of the electrode sheet unit 3 (i.e., the side of the electrode sheet unit 3 close to the roll core 2) to reduce the bending degree on the inner side of the electrode sheet unit 3, so as to avoid deformation or fracture on the inner side of the electrode sheet unit 3. Meanwhile, when making a battery with high capacity and large volume, the winding type battery cell 1 is formed by winding a plurality of the electrode sheet units 3 around the roll core 2, the size of each electrode sheet unit 3 is relatively small, that is, by increasing the number of the electrode sheet units 3 to reduce a winding length of single electrode sheet unit 3, so that the winding turns of the electrode sheet units 3 can be reduced and the winding radius of the electrode sheet units 3 can be increased, so as to significantly reduce the bending degree and bending stress of the electrode sheet units 3, thereby further avoiding the falling off of active materials on the electrode sheet 31/32 and the deformation or fracture of the electrode sheet 31/32, and greatly improving the performance of the high-capacity and large volume winding battery.

The above is only the specific embodiments of the present disclosure, but the protection scope of the present disclosure is not limited to this. Any person skilled in the art can easily think of changes or replacements within the technical scope disclosed by the present disclosure, which should be covered by the protection scope of the present disclosure. Therefore, the protection scope of the present disclosure shall be defined by the appended claims.

What is claimed is:

1. A winding type battery cell comprising a roll core and a plurality of electrode sheet units, wherein the roll core comprises a positive connection part, a negative connection part and an insulation part located between the positive connection part and the negative connection part along a length direction of the roll core, the positive connection part and the negative connection part are respectively connected with two ends of the insulation part along the length direction of the roll core; each electrode sheet unit comprises a positive electrode sheet, a negative electrode sheet and a separator, the positive electrode sheet and the negative electrode sheet are separated by the separator, each electrode sheet unit has a first side extending along the length direction of the roll core and a second side opposite to the first side, wherein the positive electrode sheet is formed with a positive tab provided at the first side of the electrode sheet unit and connected to the positive connection part, the negative electrode sheet is formed with a negative tab provided at the first side of the electrode sheet unit and connected to the negative connection part, wherein all the positive electrode sheets of the electrode sheet units are connected to the positive connection part through their positive tabs, and all the negative electrode sheets of the electrode sheet units are connected to the negative connection part through their negative tabs, the winding type battery cell is formed by winding the electrode sheet units around the positive connection part, the insulation part and the negative connection part of the roll core.

2. The winding type battery cell according to claim 1, wherein the electrode sheet unit is formed by integrated processing after laminating the positive electrode sheet, the negative electrode sheet and the separator.

3. The winding type battery cell according to claim 1, wherein the roll core is a sheet structure, the plurality of electrode sheet units are arranged sequentially along a width direction of the roll core, such that the positive tabs of all the positive electrode sheets of the electrode sheet units are connected to the positive connection part and arranged sequentially along the width direction of the roll core, and the negative tabs of all the negative electrode sheets of the electrode sheet units are connected to the negative connection part and arranged sequentially along the width direction of the roll core.

4. The winding type battery cell according to claim 3, wherein the insulation part comprises a first insulation plate and a second insulation plate arranged oppositely, the first insulation plate and the second insulation plate are respectively located on upper and lower sides of the positive connection part and the negative connection part, the positive connection part and the negative connection part are sandwiched between the first insulation plate and the second insulation plate.

5. The winding type battery cell according to claim 1, wherein the roll core is a columnar structure, the plurality of electrode sheet units are arranged sequentially along a circumferential direction of the roll core, such that the positive tabs of all the positive electrode sheets of the electrode sheet units are connected to the positive connection part and arranged sequentially along the circumferential direction of the roll core, and the negative tabs of all the negative electrode sheets of the electrode sheet units are connected to the negative connection part and arranged sequentially along the circumferential direction of the roll core.

6. The winding type battery cell according to claim 5, wherein the roll core is a round cylindrical structure or a polygonal cylindrical structure.

7. The winding type battery cell according to claim 1, wherein the positive connection part is provided with a first electrical connection part, the negative connection part is provided with a second electrical connection part, the first electrical connection part and the second electrical connection part are respectively located at two opposite ends of the roll core along the length direction of the roll core.

8. The winding type battery cell according to claim 1, wherein the number of each of the positive electrode sheet and the negative electrode sheet in each electrode sheet unit is one, the number of the separator in each electrode sheet unit is two, wherein one separator is sandwiched between the positive electrode sheet and the negative electrode sheet, and another separator is attached to one surface of the positive electrode sheet or the negative electrode sheet.

9. The winding type battery cell according to claim 1, wherein the number of each of the separator, the positive electrode sheet and the negative electrode sheet in each electrode sheet unit is multiple, the multiple positive electrode sheets and the multiple negative electrode sheets are arranged alternately, the positive electrode sheet and a neighboring negative electrode sheet are separated by a separator.

10. The winding type battery cell according to claim 9, wherein each electrode sheet unit is formed by integrated processing after laminating the multiple separators, the multiple positive electrode sheets and the multiple negative electrode sheets.

11. A winding battery comprising the winding type battery cell according to claim 1.

12. The winding type battery cell according to claim 1, wherein, along the length direction of the roll core, the positive connection part is provided at an upper section of the roll core, the negative connection part is provided at a lower section of the roll core, and the insulation part is provided at a middle section of the roll core.

* * * * *